United States Patent
Bittinger et al.

[11] Patent Number: 5,951,087
[45] Date of Patent: Sep. 14, 1999

[54] APPARATUS FOR SECURING AN INSTRUMENT PANEL TO A VEHICLE CROSS-CAR BEAM

[76] Inventors: D. Scott Bittinger, 14116 Moffett Dr., Fenton, Mich. 48430; Lawrence M. Ozga, 3338 Palmaire Ct., Rochester Hills, Mich. 48309; Steven Lepley, 4047 Gleason, Waterford, Mich. 48329

[21] Appl. No.: 08/898,389

[22] Filed: Jul. 22, 1997

[51] Int. Cl.$^6$ ................................................ B62D 25/14
[52] U.S. Cl. ................................ 296/72; 296/70; 180/90
[58] Field of Search .................................. 296/70, 72, 29, 296/97.1, 97.9, 97.13; 180/90; 403/326, 329, 397

[56] References Cited

U.S. PATENT DOCUMENTS

| | | | |
|---|---|---|---|
| 1,822,980 | 9/1931 | Palmr | 296/29 |
| 2,616,112 | 11/1952 | Smulski | 403/329 |
| 4,223,754 | 9/1980 | Mozuno et al. | 180/90 |
| 4,451,076 | 5/1984 | Viertel et al. | 296/97.1 |
| 4,940,273 | 7/1990 | Konishi | 296/97.9 |
| 5,048,996 | 9/1991 | DuBois et al. | 403/326 |
| 5,273,310 | 12/1993 | Terai | 296/70 |
| 5,411,310 | 5/1995 | Viertal et al. | 296/97.9 |
| 5,428,519 | 6/1995 | Salmon et al. | 403/296 |
| 5,507,545 | 4/1996 | Krysiak | 296/97.9 |
| 5,511,878 | 4/1996 | Dedoes et al. | 403/326 |
| 5,560,669 | 10/1996 | Gute | 296/97.9 |
| 5,685,598 | 11/1997 | Inoue et al. | 296/70 |

FOREIGN PATENT DOCUMENTS 58-167227 10/1983 Japan .................................. 296/72

*Primary Examiner*—Joseph D. Pape
*Assistant Examiner*—Kiran Patel
*Attorney, Agent, or Firm*—James R. Yee

[57] ABSTRACT

An apparatus for securing a vehicle instrument panel to a cross-car beam. The apparatus includes a boot having a first portion for secure attachment to an underside of the instrument panel and a second portion for frictionally retaining the cross-car beam. The apparatus further includes a mounting bracket for attaching the first portion to the instrument panel and providing additional spaced apart points of attachment to the instrument panel. In one form, the second portion of the boot includes a C-shaped cross section which is resiliently deflectable. The boot is secured to the instrument panel during pre-assembly of the vehicle. The configuration of the boot facilitates blind attachment of the instrument panel to the cross-car beam, without the need for any tools, during final vehicle assembly.

15 Claims, 2 Drawing Sheets

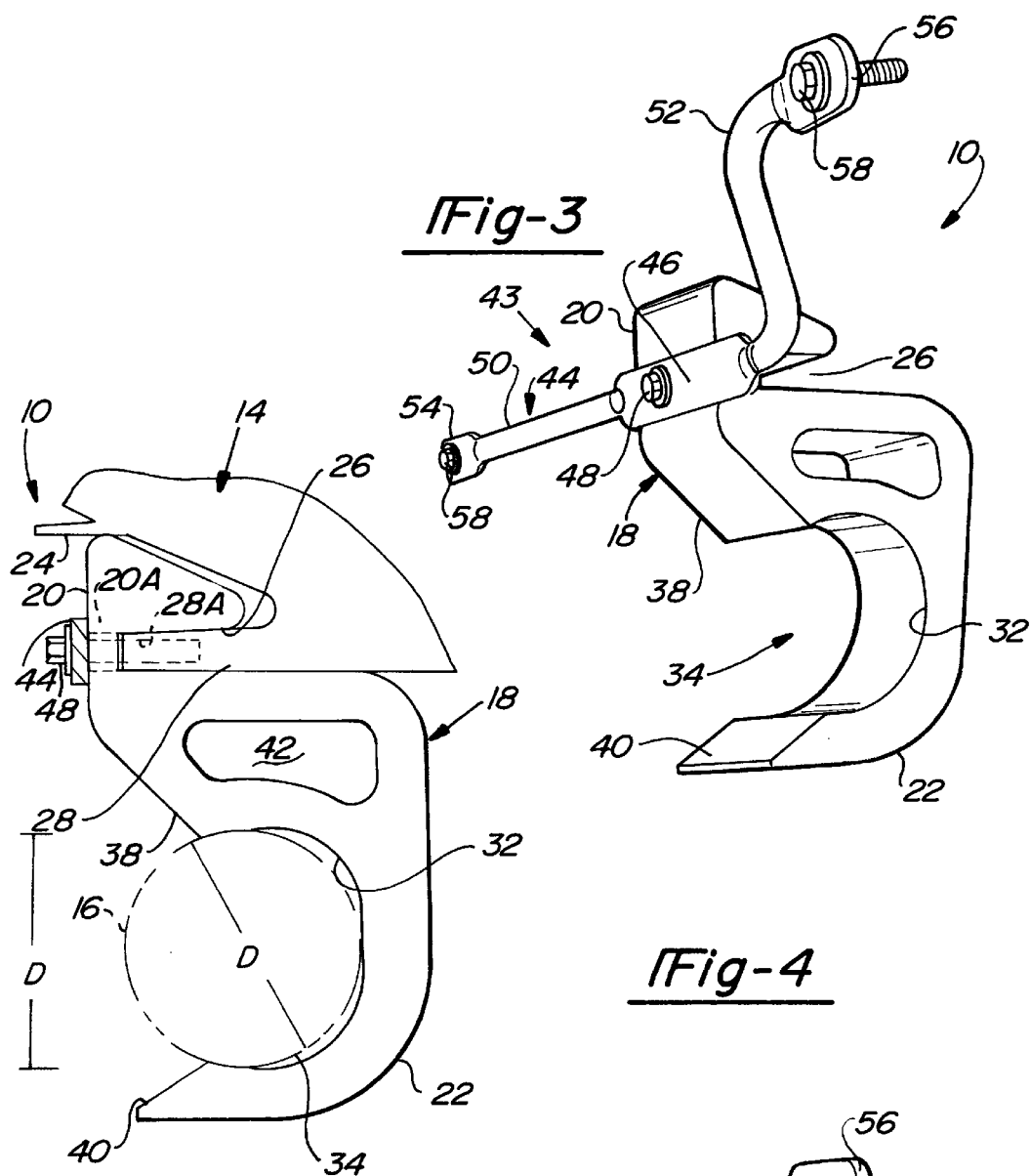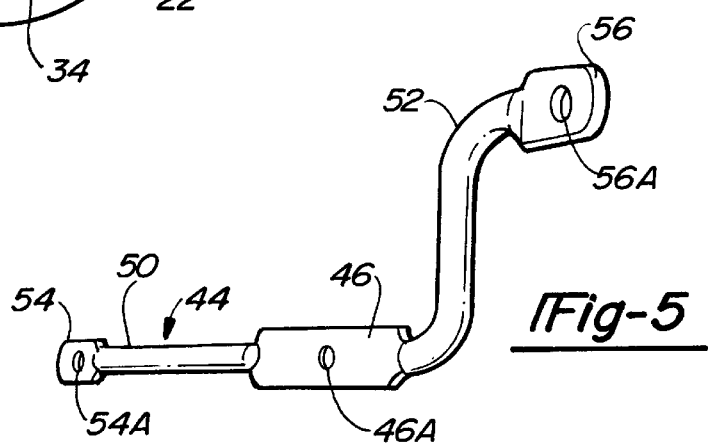

APPARATUS FOR SECURING AN INSTRUMENT PANEL TO A VEHICLE CROSS-CAR BEAM

BACKGROUND OF THE INVENTION

1. Technical Field

The present invention generally relates to an apparatus for securing a vehicle instrument panel. More particularly, the present invention relates to a boot for interconnecting a vehicle instrument panel to a cross-car beam.

2. Discussion

Modern consumers of automotive vehicles demand not only styling and mechanically reliability, but also high quality in vehicle fit and finish. Squeaks and rattles are highly undesirable. To this end, it is desirable to securely fasten vehicle instrument panels to a vehicle body structural member (e.g., the cross-car beam) to eliminate potential sources of instrument panel vibration.

While a number of options exist for fastening an instrument panel to a vehicle structural member, all are fraught with disadvantages. A typical known option involves multiple metal clips which are secured with fasteners to join the instrument panel with the cross-car beam. The parts involved for this option are expensive. Additionally, the process for installation is labor intensive and must be accomplished during final vehicle assembly. Furthermore, access to trouble spots which frequently rattle or squeak is often difficult, if not impossible. Other known methods have similar disadvantages.

SUMMARY OF THE INVENTION

The present invention to provide an apparatus and related method for securely interconnecting a vehicle instrument panel and a body structural member. In one form, the present invention provides an apparatus for securely interconnecting an instrument panel of a motor vehicle with a structural component. The apparatus includes a first portion and a second portion. The first portion is attachable to an underside of the instrument panel. The second portion is attachable to the structural component. The second portion at least partially defines a channel for receiving the structural component and maintaining frictional engagement therebetween.

In another form, the present invention provides a method of interconnecting an instrument panel of a vehicle with a cross-car beam including the following general steps:

1) providing a boot having a first portion and a second portion;
2) securely attaching the first portion to the instrument panel; and
3) frictionally engaging the second portion with the cross-car beam.

BRIEF DESCRIPTION OF THE DRAWINGS

Additional benefits and advantages of the present invention will become apparent to those skilled in the art to which this invention relates from a reading of the subsequent description of the preferred embodiment and the appended claims, taken in conjunction with the accompanying drawings.

FIG. 3 is a perspective view of the apparatus of the present invention removed from the environment of FIGS. 1 and 2 for purposes of illustration.

FIG. 4 is a fragmentary side view of the apparatus of the present invention shown in partial cross section and illustrated attached to an underside of the instrument panel.

FIG. 5 is a perpective view of the mounting bracket of the apparatus of FIG. 3.

DETAILED DESCRIPTION OF THE PREFERRED EMBODIMENT

Figure 1:
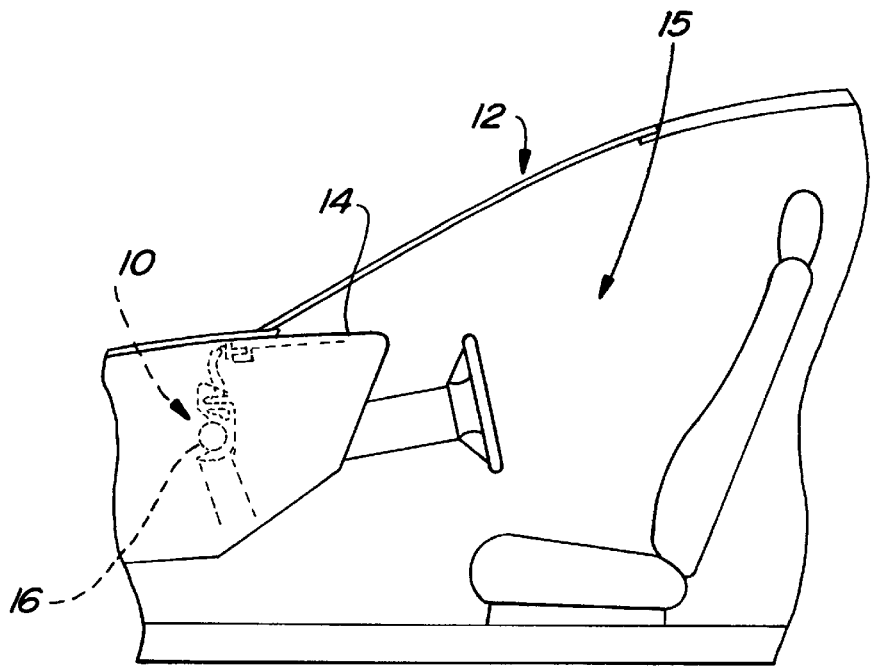
FIG. 1 is a simplified side view of a portion of a motor vehicle illustrating the vehicle instrument panel operatively interconnected with a cross-car beam through an apparatus constructed with in accordance with the teachings of the preferred embodiment of the present invention.

With initial reference to FIG. 1, a simplified view of an apparatus for securely attaching a vehicle instrument panel to a structural component in accordance with the teachings of a preferred embodiment of the present invention is shown in phantom and generally identified with reference number 10. The apparatus, or connector assembly 10 is shown operatively installed within a motor vehicle 12 which is otherwise of conventional construction. Insofar as the present invention pertains, the motor vehicle 12 includes an instrument panel 14 which traverses a forward portion of the occupant compartment 15. The motor vehicle also conventionally includes a cross-car beam 16 for providing structural integrity.

Figure 2:
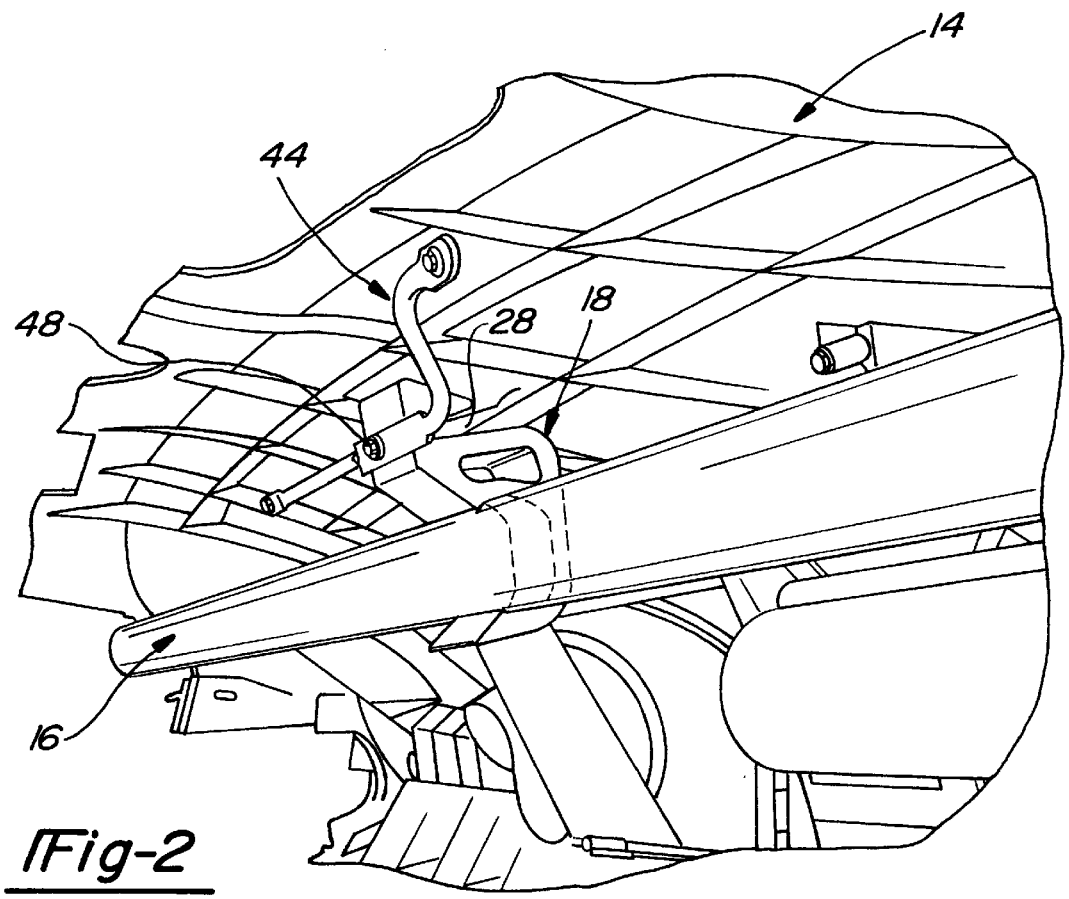
FIG. 2 is a rear perspective view of the of the present invention further illustrating the interconnection between the cross-car beam and the instrument panel.

With continued reference to FIG. 1, and additional reference to FIGS. 2 through 4, the apparatus 10 of the present invention will be further discussed. The apparatus 10 is shown to include a boot 18 unitarily formed to include a first portion 20 and a second portion 22. In the exemplary embodiment illustrated, the boot 18 is made from rubber through a conventional extrusion process and is capable of absorbing vibrational forces. Alternatively, other suitable materials known in the art may be utilized.

The first portion 20 of the boot 18 is configured for secure attachment to an underside 24 of the instrument panel 14. As shown more clearly in FIGS. 3 and 4, the first portion of the boot 18 defines a recess 26 for receiving a boss portion 28 extending generally horizontal from the underside 24 of the instrument panel 14.

The second portion 22 of the boot 18 is generally C-shaped in cross section and includes an arcuate wall 32 which partially defines a channel 34 for receiving the cross-car beam 16. The opening to the channel 34 has a dimension d which is slightly smaller than the diameter D of the cross-car beam 16. The resilient nature of the material used to construct the boot 18 permits the second portion 22 of the boot 18 to resiliently reflect upon insertion of the cross-car beam 16 within the channel 34.

To further assist in insertion of the cross-car beam 16 into the channel 34, the second portion 22 of the boot 18 includes a pair of chamfered surfaces 38 and 40. The chamfered surfaces 38 and 40 approach one another as they progress toward the opening of the channel 34. When the second portion 22 of the boot 18 is brought into operative association with the cross-car beam 16, the chamfered surfaces 38 and 40 provide a larger target area to ensure successful engagement. This feature is particularly critical for the present application as blind attachment to the instrument panel 14 occurs with the cross-car beam 16.

The boot 18 is further shown to include a void 42 interdisposed between the first portion 20 and the second 22. The void 42 reduces the amount of material required in producing the boot 18. In addition, the void 42 reduces the weight of the boot 18.

The apparatus 10 of the present invention is further shown to include means 43 for connecting said boot portion to the instrument panel and for transferring vibrational forces from said instrument panel to said boot portion. In the preferred embodiment, the means 43 includes a mounting bracket 44. In the embodiment illustrated, the mounting bracket 44 includes a generally planar central portion 46 having an aperture 46A. A fastener, such as a threaded fastener 48, passes through the aperture 46A in the central portion 46, through an aperture 20A formed in the first portion 20 and into a hole 28A located within the boss 28 of the instrument panel 14. The boss 28 is preferably formed to include internal threads (not shown) for cooperating with external threads of the thread fastener 48.

The mounting bracket 44 is further shown to include first and second arms 50 and 52 extending from the intermediate portion 46 and terminating in first and second ends 54 and 56, respectively. The first and second ends 54 and 56 are formed to include apertures 54A, 56A for receiving threaded fasteners 58. The threaded fasteners engage internally threaded apertures (not shown) provided on the underside 24 of the instrument panel 14. Alternatively, it will be understood that the mounting bracket 44 may be attached to the instrument panel 14 in any other manner well known in the art. The mounting bracket 34 serves to further stabilize the instrument panel 14 by providing spaced apart attachment to the boot 18. As a result, vibrational forces along the instrument panel 14 are routed through the bracket 44 and are at least partially absorbed by the boot 18.

With continued reference to FIGS. 1 through 4, the preferred method of the present invention will now be described. The method of the present invention begins with the general step of providing the boot 18 which includes the first and second portions 20 and 22. The next general step of the present invention involves securely attaching the first portion 20 to the instrument panel 14. As discussed above, the first portion 20 is securely attached to the instrument panel 14 through the mounting bracket 44. Additionally, the mounting bracket 44 is attached to an underside 24 of the instrument panel 14 at spaced apart points. Advantageously, the boot 18 can be completely attached to the instrument panel 14 during pre-assembly of the vehicle 12. As a result, the amount of labor necessary for final vehicle assembly is reduced.

The final general step of the present invention involves frictionally engaging the second portion 22 with the cross-car beam 16. As the instrument panel 14 is urged into position, the operator is unable to see the boot 18. The chamfered surfaces 38 and 40 cooperate to urge the cross-car beam 16 into proper position, thereby facilitating blind attachment. As the cross-car beam 16 is passed into the channel 34, the second portion 22 is resiliently deflected to accommodate the diameter D thereof. Upon completing insertion, the second portion 22 resiliently retracts and thereby frictionally retains the cross-car beam 16.

While the above description constitutes the preferred embodiment of the invention, it will be appreciated that the invention is susceptible to modification, variation, and change without departing from the proper scope or fair meaning of the accompanying claims.

We claim:

1. In a motor vehicle having a dash instrument panel and a structural component, an apparatus for securely interconnecting the dash instrument panel to the structural component, comprising:

a boot portion having a first portion and a second portion, said first portion being adapted to be attached to the dash instrument panel and said second portion being adapted to be attached to the structural component, said second portion defining a channel for receiving the structural component and maintaining frictional engagement therebetween; and, a mounting bracket attached to said boot portion and being adapted to be attached to the dash instrument panel.

2. The motor vehicle of claim 1 wherein said first portion defines a recess for receiving a boss extending from the dash instrument panel.

3. The motor vehicle of claim 1 wherein said mounting bracket includes first and second ends securely attached to the dash instrument panel.

4. The motor vehicle of claim 3 further including a fastener passing through an aperture in said mounting bracket and engaging an aperture in the dash instrument panel.

5. The motor vehicle of claim 1 wherein said second portion includes a generally C-shaped cross-section for receiving the structural member.

6. The motor vehicle of claim 5 wherein said second portion resiliently deflects to receive said structural member.

7. A connector assembly for securely interconnecting a dash instrument panel of a motor vehicle with a cross-car beam, the dash instrument panel including an underside having a boss portion, the connector assembly comprising:

a boot member including first portion and a second portion, said first portion attachable to an underside of the dash instrument panel and said second portion attachable to the cross-car beam, said second portion at least partially defining a channel for receiving the cross-car beam and maintaining frictional engagement therebetween, and a mounting bracket attached to said boot portion and being adapted to be attached to the dash instrument panel.

8. The connector assembly of claim 7 wherein said first portion defines a recess for receiving a boss extending from the dash instrument panel.

9. The connector assembly of claim 7 wherein said mounting bracket is attached to the dash instrument panel at lateral spaced apart points.

10. The connector assembly of claim 7 wherein said second portion includes a generally C-shaped cross-section for receiving the cross-car beam.

11. The connector assembly of claim 7 wherein said second portion is operative to resiliently deflect for receiving the cross-car beam.

12. The connector assembly of claim 7 wherein said boot member is composed of a vibrational energy absorbing material.

13. An apparatus for securing a dash instrument panel of a motor vehicle to a structural component of the motor vehicle, comprising:

a boot portion having a first portion and a second portion, said first portion being adapted to be attached to the dash instrument panel and said second portion being adapted to be attached to the structural component, said second portion defining a channel for receiving the structural component and maintaining frictional engagement therebetween; and, means for connecting said boot portion to the dash instrument panel and for transferring vibrational forces from said dash instrument panel to said boot portion.

14. An apparatus as set forth in claim 13, wherein said means for connecting includes a mounting bracket having a central portion having a second aperture and at least one end portion, said at least one end portion being adapted to fixedly attach said mounting bracket to the dash instrument panel.

15. An apparatus for securing a dash instrument panel of a motor vehicle to a structural component of the motor vehicle, the dash instrument panel having a boss portion, comprising:

a boot portion having a first portion and a second portion, said first portion forming a recess shaped to fit the boss portion of the dash instrument panel, said recess having a first aperture, and said second portion attachable to the structural component, said second portion defining a channel for receiving the structural component and maintaining frictional engagement therebetween;

a mounting bracket having a central portion having a second aperture and at least one end portion, said at least one end portion being adapted to fixedly attach said mounting bracket to the dash instrument panel; and, a first fastener positioned through said first aperture of said boot portion and said second aperture of said mounting bracket and adapted to securely fasten said dash instrument panel to the boot portion and said mounting bracket to said boot.

* * * * *